J. W. BATE.
EXTENSION HANDLE.
APPLICATION FILED OCT. 6, 1921.
1,420,809.
Patented June 27, 1922.
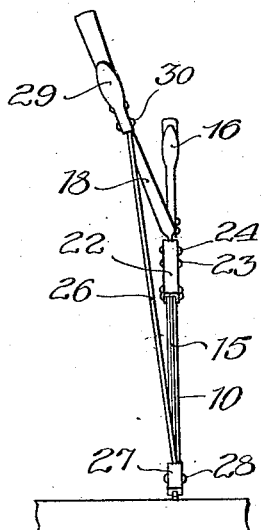
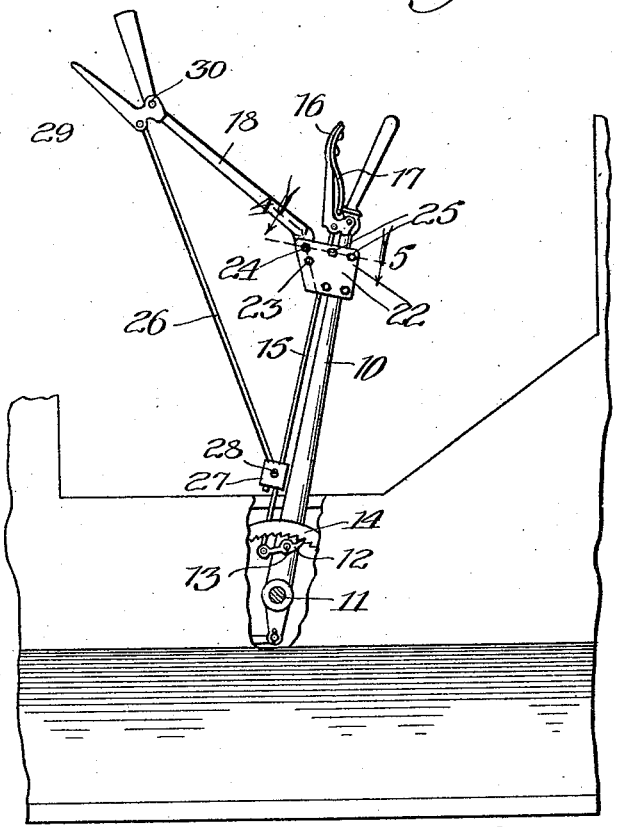
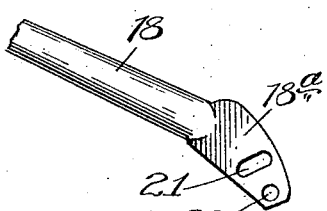
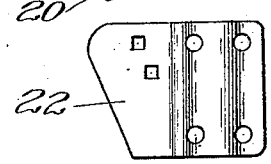
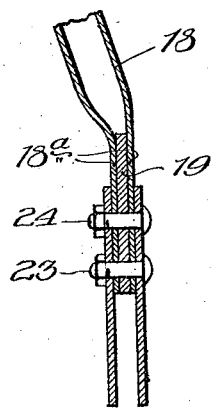
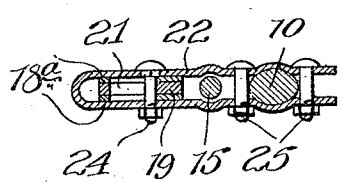

UNITED STATES PATENT OFFICE.

JOHN W. BATE, OF RACINE, WISCONSIN.

EXTENSION HANDLE.

1,420,809.  Specification of Letters Patent.  Patented June 27, 1922.

Application filed October 6, 1921. Serial No. 505,763.

*To all whom it may concern:*

Be it known that I, JOHN W. BATE, a citizen of the United States, residing at Racine, in the county of Racine and State of Wisconsin, have invented a new and useful Improvement in Extension Handles, of which the following is a specification.

This invention relates to extension handles and is fully described in the following specification and shown in the accompanying drawings, in which—

Figure 1 is a partial side elevation of an automobile, showing a control lever with the extension handle attached thereto;

Fig. 2 is a rear elevation of the same;

Fig. 3 is a partially enlarged side elevation of the attached means;

Fig. 4 is an enlarged partial section on the line 4 of Fig. 1; and

Fig. 5 is an enlarged section on the line 5 of Fig. 1.

This device is illustrated as applied to the control lever 10 of a Ford automobile. This control lever is hingedly mounted on a pin 11 and carries a pawl 12 hingedly mounted on a pin 13 on the lever 10 and which engages the ratchet 14. This pawl is operated by means of a rod 15 which is connected to a grip 16, the latter carrying a spring 17 which normally acts to force the pawl 12 into engagement with the ratchet 14.

This lever is inaccessible as ordinarily placed and the extension handle which will now be described overcomes this difficulty. The extension handle 18 is preferably formed out of sheet metal, as shown in Fig. 4, the lower end being flattened at 18$^a$ and having a piece of sheet metal 19 inserted therein. A round hole 20 and an elongated hole 21 are formed in the lower end of this handle.

A plate 22 is bent into U-shape, as shown in Fig. 5, the space between the sides being substantially the same as the thickness of the end of the handle 18$^a$ which is placed therebetween. The bolts 23 and 24 pass through the plate 22 and through the holes 20 and 21.

It will thus be seen that the handle 18 may be moved about the bolt 23 as a center and it may be locked to the plate 22 at any desired point in the swing by means of the bolt 24. The plate 22 passes around the lever 10 and is secured thereto near the upper end by means of bolts 25. Sufficient space is allowed between the plates 22 to permit of easy movement of the rod 15.

An operating rod 26 is secured to the rod 15 by means of a U-shaped plate 27 and a bolt 28. This rod is hingedly connected at the upper end of a hand grip 29 which in turn is pivotally mounted at 30 to the extension handle 18.

When it is desired to shift the lever 10 the operator grasps the upper end of the handle 18 and the grip 29, grasping the two together, thereby releasing the pawl 12 from the ratchet 14. While held in this position the lever 18 may be moved either backward or forward to the desired position and locked therein by releasing the grip 29.

While I have illustrated but a few embodiments of my invention, it is to be understood that it is capable of many modifications. Changes, therefore, in the construction and arrangement may be made without departing from the spirit and scope of the invention as disclosed in the appended claims in which it is my intention to claim all novelty inherent to my invention as broadly as possible in view of the prior art.

What I claim as new, and desire to secure by Letters Patent, is:

1. In combination, a lever, a pawl for locking said lever, a rod carried by said lever for operating said pawl, an extension handle pivotally secured to the lever, means for securing it in any adjusted position and means carried by said handle for operating the rod.

2. In combination, a lever, a pawl for locking said lever, a rod carried by said lever for operating said pawl, an extension handle pivotally secured to the lever, means for securing it in any adjusted position and a grip carried by said handle and connected to said rod for operating said pawl.

3. An extension handle comprising a sheet metal clamp having spaced plates adapted to be placed on opposite sides of a lever, both for securing said clamp to the lever, a handle hingedly mounted between said plates and means for clamping said handle in adjusted position.

JOHN W. BATE.